United States Patent [19]
Ziegler

[11] 3,969,839
[45] July 20, 1976

[54] PORTABLE ELECTRIC LIGHT DEVICE

[76] Inventor: Moses Ziegler, 12638 Roselawn, Detroit, Mich. 48238

[22] Filed: May 23, 1975

[21] Appl. No.: 580,530

[52] U.S. Cl. .............................................. 43/17.6
[51] Int. Cl.² ........................................ A01K 85/00
[58] Field of Search ................................... 43/17.6

[56] References Cited
UNITED STATES PATENTS

| 2,070,755 | 2/1937 | Seigle et al. | 43/17.6 |
| 2,458,611 | 1/1949 | Long | 43/17.6 X |
| 2,754,610 | 7/1956 | Carlson | 43/17.6 |

*Primary Examiner*—Louis G. Mancene
*Assistant Examiner*—Daniel J. Leach
*Attorney, Agent, or Firm*—Cullen, Settle, Sloman & Cantor

[57] ABSTRACT

A portable electric light device comprises a body having a longitudinal bore with closed end of small diameter, a central part of larger diameter and an open end of increased diameter internally threaded. A switching, sealing and closing cap has a threaded projection for extension into said body. A flashlight bulb is nested in the small diameter bore and a dry cell is nested in the central bore portion in engagement with the bulb. A conductor wire is secured to the bulb base, and extends along the dry cell within the intermediate bore and terminates in a coil spring normally spaced from the contact end of the battery. The cap projection has a socket which guidably receives the spring. Rotative assembly of the cap to the body moves the spring into engagement with the battery to energize the bulb and at the same time seal off the interior of the body.

1 Claim, 3 Drawing Figures

PORTABLE ELECTRIC LIGHT DEVICE

BACKGROUND OF THE INVENTION

Illuminated lures are known to the art, and examples thereof are found in the following U.S. Pat. Nos:
1,982,609
2,002,135
2,121,114
2,190,791
2,749,220
3,077,046

BRIEF DESCRIPTION OF THE INVENTION

It is an object of the present invention to provide an improved portable electric light source which may be employed as a fishing lure, having the usual leaders and hooks and which includes a battery-electric light circuit which is normally open. Said circuit is closed at the same time as the head is threaded into the body into sealing engagement therewith.

These and other objects will be seen from the following specification and claim in conjunction with the appended drawing.

THE DRAWING

FIG. 1 is an elevational view of the device.
FIG. 2 is an elongated cross sectional view.
FIG. 3 is a transverse view taken on line 3—3 of FIG. 2.

DETAILED DESCRIPTION OF THE INVENTION

Figure 1:
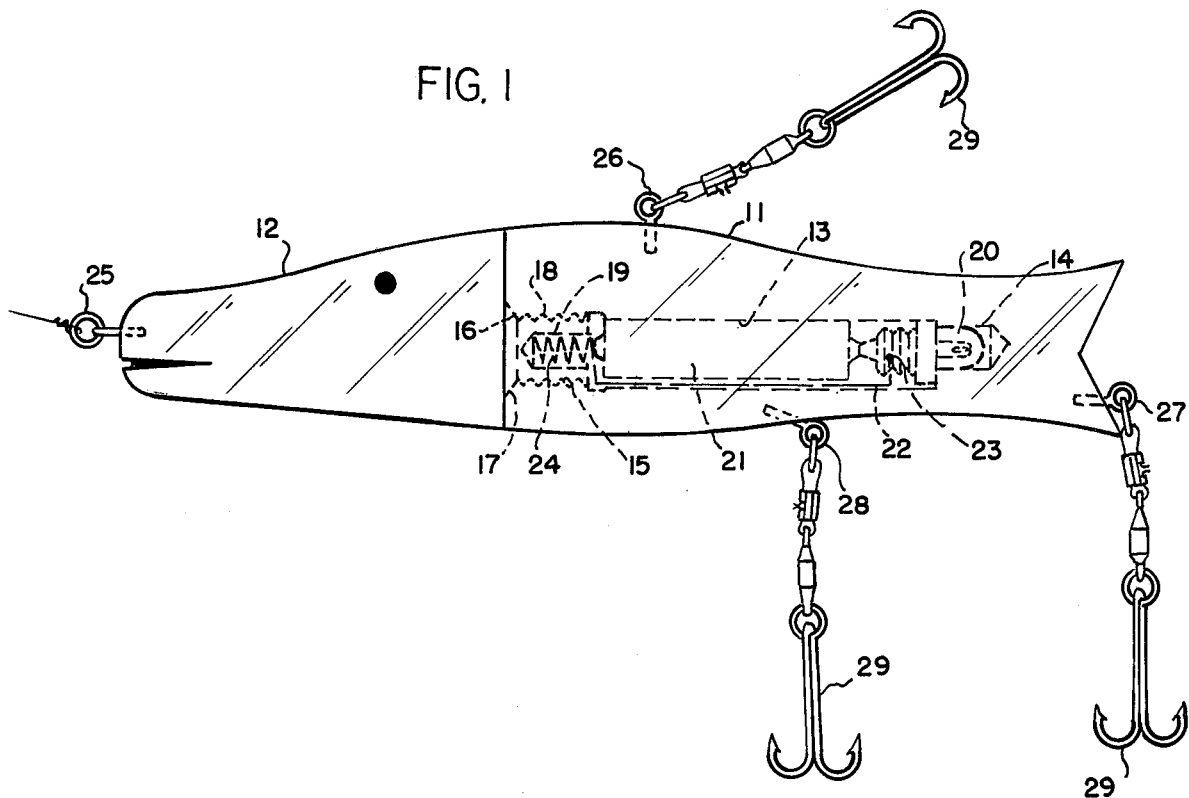
Figure 2:
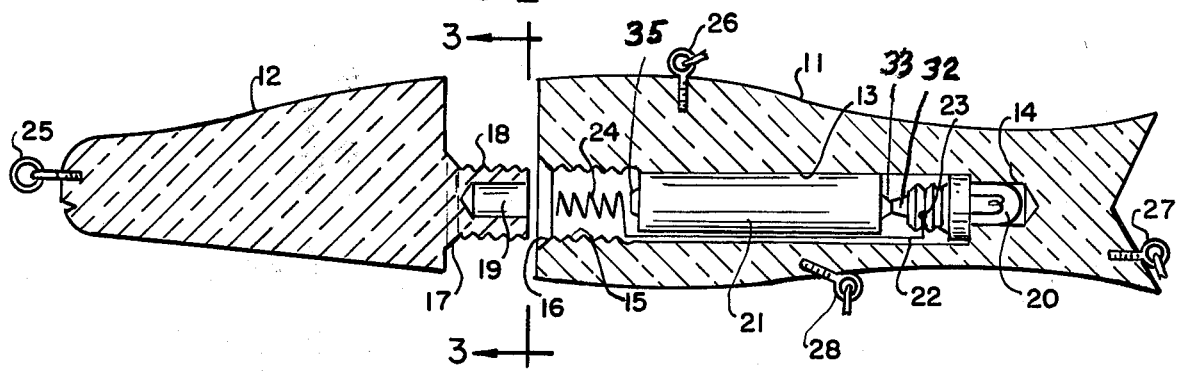
Figure 3:
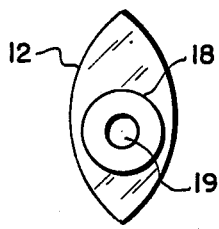

The portable electric light device comprises a body 11 and a cap 12, formed wholly as shown, or at least partially, of translucent plastic so as to be illuminable and thus provide an illuminable fish lure. For fish lure purposes it is provided with leaders or hooks, at eyes 25, 26, 27, 28; with hooks being shown at 29. A support leader may replace hook 29 on eye 26.

Body 11 has a long bore 13–14–15, comprising a small bore part 14, a larger diameter central bore part 13, and a still larger female threaded bore part 15, formed with a sealing bevel 16.

Switching-sealing-closing cap 12 has a sealing bevel 17, a male threaded projection 18 complementary to bore part 15, and a cap bore or socket 19.

Bore part 14 contains a conventional flashlight bulb 20 whose threaded stem 23 is soldered to one end of a fine conductor or wire 22 formed to lie in bore part 13. The other end of wire 22 is formed as a coil spring 24 formed to lie in socket 19 and thus in bore part 15 when cap 12 is fully threaded onto body 11.

Tip 32 of bulb 20 is formed to be engaged by contact end 33 of a dry cell 21 nested in bore part 13 alongside wire 22. The other end of the cell 12 has a contact tip 35 normally spaced from and adapted to be engaged by spring 24 for making the circuit 24–22–23–20–32–3-3–21–35–24 when cap 12 is fully threaded onto body 11, closing and sealing the body bore at 16–17. A gasket is assembled over bevel 17.

A turn or two of cap 12 outward of body 11, FIG. 1, breaks such circuit; and a reverse turn or two will remake such circuit.

Until the cap is threaded to fully closed sealing position, FIG. 1, spring 24 is nested and guided within socket 19 and spaced from contact 35 of the dry cell. On full assembly of said cap, spring 24 is moved into engagement with battery contact 35.

Now having described the device herein shown, reference should be had to the claim which follow.

I claim:

1. A portable electric light device comprising a body of non-conductive material having a long bore whose closed end is of small diameter, whose central part is of somewhat larger diameter, and whose open end is even larger and internally or female threaded;

a switching-sealing-closing cap having a male threaded projection formed complementary to the female threaded part of the body bore, whereby to provide a separable switch-seal-closing juncture of the cap and the body;

an electric light device in said body bore comprising a flashlight bulb formed to fit into the small part of the body bore and whose contact tip is exposed to the central part of the body bore; a conductor formed to lie in such central part and having one end joined to the contact tip of the bulb and another end formed as a coil spring and formed to lie in the threaded part of said bore to be engaged by the cap projection when the cap is threaded into the body bore, for switching and bore sealing, and closing;

a dry cell formed with contact ends and formed to lie in the central part of the body bore alongside said conductor, with one cell contact end positioned to engage the contact tip of the lightbulb when the cap projection is fully threaded into the body bore threaded part and biases the coil spring inner end into engagement with the other contact end of the cell, to make the circuit of spring-conductor wire-bulb-cell-spring; and to release the spring from the cell other end, when the cap projection is threaded at least partially outward from the body bore threaded part, to break the circuit, said body and cap being at least partially formed of translucent plastic so as to be illuminated by the lightbulb, and thus be effective as an illuminated lure, said cap projection having an axial bore receiving said spring and on inward movement of said cap, guiding said spring into contact with said dry cell.

* * * * *